United States Patent
Hayakawa

(10) Patent No.: US 11,223,517 B2
(45) Date of Patent: Jan. 11, 2022

(54) INDEPENDENT AND INTERLOCKING REDUNDANCY SYSTEM

(71) Applicant: SUBARU CORPORATION, Tokyo (JP)

(72) Inventor: Masahito Hayakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 83 days.

(21) Appl. No.: 16/592,161

(22) Filed: Oct. 3, 2019

(65) Prior Publication Data

US 2020/0177440 A1 Jun. 4, 2020

(30) Foreign Application Priority Data

Dec. 3, 2018 (JP) .............................. JP2018-226190

(51) Int. Cl.
*H04L 12/24* (2006.01)
*H04L 29/08* (2006.01)

(52) U.S. Cl.
CPC .......... *H04L 41/0668* (2013.01); *H04L 67/12* (2013.01)

(58) Field of Classification Search
None
See application file for complete search history.

(56) References Cited

U.S. PATENT DOCUMENTS

| 3,890,493 | A | | 6/1975 | Burtness et al. | |
|---|---|---|---|---|---|
| 6,018,570 | A | * | 1/2000 | Matison | H04L 63/0876 379/154 |
| 6,622,262 | B1 | * | 9/2003 | Nagoya | G06F 11/1654 714/13 |
| 6,721,882 | B1 | * | 4/2004 | Mbarki | G06F 9/4403 713/1 |

(Continued)

FOREIGN PATENT DOCUMENTS

| EP | 1020797 A2 | 7/2000 |
|---|---|---|
| FR | 2422196 A1 | 11/1979 |

(Continued)

OTHER PUBLICATIONS

Extended European Search Report issued in corresponding European Patent Application No. 19205387.4-1224, dated Apr. 29, 2020.

*Primary Examiner* — Brandon M Renner
(74) *Attorney, Agent, or Firm* — McDermott Will & Emery LLP

(57) ABSTRACT

An independent and interlocking redundancy system includes one or more control targets, operation processors, and one or more standby processors. The one or more standby processors is configured to make transition from a standby state to a warming-up state when one of the operation processors malfunctions, transmit, in the warming-up state and to the one or more control targets, a control command same as that transmitted to the one or more control targets by non-malfunctioning one of the operation processors, at a timing at which the malfunctioning one of the (Continued)

operation processors is supposed to transmit the control command, and determine and transmit the control command independently from and by taking turns with respect to the non-malfunctioning one or more of the operation processors, after warm-up of the one or more standby processors is completed.

2 Claims, 2 Drawing Sheets

(56) References Cited

U.S. PATENT DOCUMENTS

| | | | |
|---|---|---|---|
| 2010/0019855 A1* | 1/2010 | Barrow | H03L 7/085 |
| | | | 331/1 A |
| 2012/0185726 A1* | 7/2012 | Duron | G06F 11/3062 |
| | | | 714/11 |

FOREIGN PATENT DOCUMENTS

| | | |
|---|---|---|
| JP | 08-255091 A | 10/1996 |
| JP | 2004-280853 A | 10/2004 |

* cited by examiner

INDEPENDENT AND INTERLOCKING REDUNDANCY SYSTEM

CROSS-REFERENCE TO RELATED APPLICATIONS

The present application claims priority from Japanese Patent Application No. 2018-226190 filed on Dec. 3, 2018, the entire contents of which are hereby incorporated by reference.

BACKGROUND

The technology relates to a redundancy system that allows for redundancy of a system that includes multiple processors.

A mobile body, such as an aircraft, is typically provided with a system that includes multiple processors. For example, the aircraft is provided with such a system for controls including a flight control, allowing for redundancy of the system and thereby preventing a flight or any other operation of the aircraft from being influenced even when a malfunction occurs in one of the processors.

Various techniques have been proposed that achieve the redundancy of the system that includes the multiple processors.

For example, Japanese Unexamined Patent Application Publication (JP-A) No. 2004-280853 discloses a technique of a system that includes multiple processors and a redundancy processor. The technique causes the redundancy processor to take over logical setting of a malfunctioning processor when any of the processors malfunctions, making it possible to continue operation without changing logical connections.

JP-A No. H08-255091 also discloses a technique of a system that includes multiple processors and a redundancy processor. The technique compares a memory content between the multiple processors to identify a malfunctioning processor when any of the processors malfunctions, and causes the redundancy processor to copy the memory content from a non-malfunctioning processor among the multiple processors to thereby restore the system.

SUMMARY

An aspect of the technology provides an independent and interlocking redundancy system that includes: one or more of control targets; operation processors configured to transmit, independently from each other and by taking turns, a control command to the one or more control targets; and one or more standby processors. The one or more standby processors is configured to: make a transition from a standby state to a warming-up state when one of the operation processors malfunctions; transmit, in the warming-up state and to the one or more control targets, the control command that is same as the control command transmitted to the one or more control targets by non-malfunctioning one of the operation processors, at a timing at which the malfunctioning one of the operation processors is supposed to transmit the control command to the one more control targets; and determine the control command and transmit, to the one or more control targets, the determined control command independently from non-malfunctioning one or more of the operation processors and by taking turns with respect to the non-malfunctioning one or more of the operation processors, after the warming-up state and warm-up of the one or more standby processors is completed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
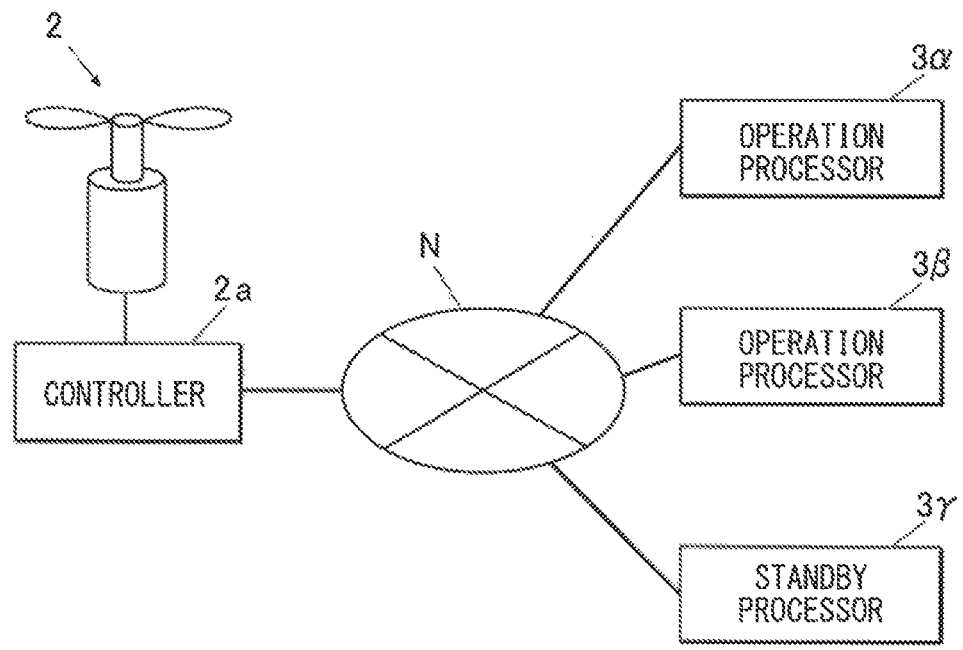
FIG. 1 is a diagram illustrating an example of a configuration of an independent and interlocking redundancy system according to one example embodiment of the technology.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Existing systems, including those according to JP-A No. 2004-280853 and JP-A No. H08-255091, can involve a time period in which none of processors perform a control to be performed on a control target, from a timing at which a processor is malfunctioned to a timing at which a switchover is performed from the malfunctioning processor to a redundancy processor. A timing of the control to be performed on the control target can also be delayed, from the timing at which the processor is malfunctioned to the timing at which the switchover is performed.

Such a situation where the control target is uncontrolled by any of the processors (i.e., an interruption occurs in the control to be performed by the processors) or where the control timing is delayed can lead to concerns. For example, in a case where a mobile body is an aircraft, a flight of the aircraft may possibly become difficult. Accordingly, there is still room for improvement in terms of safety, etc., of the mobile body such as the aircraft.

It is desirable to provide a system, i.e., an independent and interlocking redundancy system, that is able to continue performing a control without causing a situation where a control target is uncontrolled by processors or where a control timing is delayed even when any of the processors malfunctions in a system that includes the multiple processors.

The independent and interlocking redundancy system 1 according to the following example embodiment may include two operation processors 3α and 3β and one (or a single) standby processor 3γ to thereby control one (or a single) control target 2. The configuration of the independent and interlocking redundancy system 1 according to the following example embodiment, however, is illustrative and non-limiting. In some embodiments, the independent and interlocking redundancy system 1 may include three or more operation processors, and/or may include two or more standby processors, i.e., may include multiple standby processors. In some embodiments, the independent and interlocking redundancy system 1 may control two or more control targets, i.e., may control multiple control targets.

Further, in the independent and interlocking redundancy system 1 according to the following example embodiment, the control target 2 may include a controller 2a. The controller 2a may cause the operation processors 3α and 3β and the standby processor 3γ to transmit, to the controller 2a of the control target 2, parameters necessary for controlling the control target 2, to thereby allow the operation processors 3α and 3β and the standby processor 3γ to control the control target 2.

It is to be noted, however, that how the operation processors 3α and 3β and the standby processor 3γ control the control target 2 is not limited to the above configuration in which the control target 2 includes the controller 2a. In some embodiments, data, instructions, signals, and/or other factors may be transmitted to control the control target 2. Accordingly, embodiments of the technology may employ various control schemes, depending on, for example, a type of the control target 2 and/or how the system is constructed.

In the following example embodiment, the parameters, the data, the instructions, the signals, and/or other factors, transmitted from the operation processors 3α and 3β and the standby processor 3γ to control the control target 2, are collectively referred to as a "control command".

In some embodiments where relevant one of the operation processors and the standby processor transmits the control command on the basis of a transmission request that is transmitted from the control target to the relevant one of the operation processors and the standby processor, a timing at which the relevant one of the operation processors and the standby processor transmits the control command to the control target may be a timing at which the transmission request is transmitted from the control target to the relevant one of the operation processors and the standby processor.

In some embodiments where relevant one of the operation processors and the standby processor transmits the control command to the control target on the basis of an external clock that causes elements including, but not limited to, the operation processors, the standby processor, and the control target to be in synchronization with each other, the timing at which the relevant one of the operation processors and the standby processor transmits the control command to the control target may be a timing at which the external clock is issued.

Accordingly, the timing at which the operation processors and the standby processor transmit the control command to the control target may vary depending on, for example, how the system is constructed.

FIG. 1 is a diagram illustrating an example of a configuration of an independent and interlocking redundancy system according to an example embodiment of the technology.

The independent and interlocking redundancy system 1 includes the control target 2, the multiple operation processors 3α and 3β, and the standby processor 3γ. The operation processors 3α and 3β transmit, independently from each other and by taking turns, the control command to the control target 2.

The independent and interlocking redundancy system 1 may have a configuration in which the control target 2, the operation processors 3α and 3β, and the standby processor 3γ are coupled through a communication network N. In an alternative example embodiment, however, the control target 2, the operation processors 3α and 3β, and the standby processor 3γ may be coupled directly without the intervention of the communication network N. Accordingly, how the control target 2, the operation processors 3α and 3β, and the standby processor 3γ are coupled is not limited to the coupling through the communication network N.

It is to be also noted that, in the following description, wordings are sometimes used in which, for example, relevant one of the operation processors 3α and 3β transmits the control command to the communication network N. In this case, the control target 2 receives the control command from the communication network N, meaning that, after all, the control command is transmitted from the relevant one of the operation processors 3α and 3β to the control target 2.

The control target 2 may include the controller 2a as described above. The controller 2a may receive the control command from the communication network N. In other words, the controller 2a may receive the control command from relevant one of the operation processors 3α and 3β through the communication network N. Upon receiving the control command, the controller 2a may control the control target 2 on the basis of the received control command.

In some embodiments, however, the control target 2 may not include the controller 2a. Accordingly, any configuration may be employed as long as the control target 2 is controlled by the operation processors 3α and 3β.

One or more of the operation processors 3α and 3β and the standby processor 3γ may be, or may include, a computer or any other arithmetic processor, for example.

A description is given first on the operation processors 3α and 3β. In an example embodiment, the operation processors 3α and 3β is provided in the independent and interlocking redundancy system 1. Further, in an example embodiment, relevant one of the operation processors 3α and 3β may determine the control command, e.g., a parameter in this case, to be transmitted to the control target 2 and transmit the determined control command to the communication network N at a predetermined timing. Further, when the transmission of the control command is completed, the relevant one of the operation processors 3α and 3β may transmit an end signal to the communication network N.

The operation processors 3α and 3β according to an example embodiment may thus individually monitor, for example, a timing at which the transmission request is transmitted from the control target or a timing of the issuance of the external clock that allows for synchronization, without making a contact with each other. On the basis of the individually-monitored timing, the operation processors 3α and 3β transmit the control command independently from each other.

Hence, the term "independent" of the independent and interlocking redundancy system 1 according to an example embodiment means that the operation processors 3α and 3β transmit, independently from each other, the control command to the control target 2.

Further, the operation processors 3α and 3β transmit the control command to the communication network N by taking turns. In other words, the operation processors 3α and 3β transmit the control command to the control target 2 by taking turns. An example embodiment illustrated in FIG. 1 includes two operation processors 3α and 3β, whereby the operation processors 3α and 3β may transmit the control command alternately.

Accordingly, the control command may be transmitted appropriately from relevant one of the operation processors 3α and 3β at each timing, as seen from the control target 2.

Hence, the term "interlocking" of the independent and interlocking redundancy system 1 according to an example embodiment means that the operation processors 3α and 3β transmit the control command by taking turns to control the control target 2, as if the operation processors 3α and 3β are so interlocked with each other as to control the control target 2. Note that the term "interlocking" does not mean that the operation processors 3α and 3β make a contact with each other to perform the control.

The operation processors according to an example embodiment are thus configured to transmit, independently from each other and by taking turns, the control command to the control target 2. In some embodiments, the operation processors may transmit the control command independently from each other and by taking turns through the communication network N.

In some embodiments, the n-number of operation processors in the independent and interlocking redundancy system 1 may individually monitor the above-described timing, where "n" is an integer of two or more. When relevant one of the operation processors determines the control command and transmits the control command at a certain timing, the relevant one of the operation processors may refrain from determining the control command at each of timings from a first timing to an "n−1 th" timing, and may determine the control command and transmit the determined control command at an "n th" timing. The first timing is a timing that is subsequent to the certain timing.

The operation processors may thus perform the above operation independently from each other, in such a manner that the timing at which each of the operation processors performs the above operation is shifted by one timing. With this configuration, the operation processors transmit the control command to the control target 2 by taking turns for each timing.

In such an example embodiment, each of the operation processors may have, in advance, inputted data on the number "n" of the operation processors provided in the independent and interlocking redundancy system 1.

Further, once instructions are given to each of the operation processors on a timing at which a first process is to be performed, each of the operation processors from then on may automatically determine the control command and transmit the determined control command at a relevant timing at which the own operation processor should perform a process. Thus, the operation processors transmit the control command by taking turns.

For example, the independent and interlocking redundancy system 1 according to an example embodiment illustrated in FIG. 1 may include two operation processors 3α and 3β. In this case, the operation processors 3α and 3β may transmit, by taking turns, the control command at their respective timings in order of the operation processor 3α, the operation processor 3β, the operation processor 3α, the operation processor 3β, and so forth. In other words, in this case, the operation processors 3α and 3β may transmit the control command at their respective timings in an alternate fashion.

In an alternative embodiment where the independent and interlocking redundancy system 1 includes three operation processors A, B, and C, the operation processors A, B, and C may transmit, by taking turns, the control command at their respective timings in order of the operation processor A, the operation processor B, the operation processor C, the operation processor A, the operation processor B, the operation processor C, and so forth.

As described above, the operation processors may individually monitor the above-described timing, and may perform operations including the determination and the transmission of the control command on the basis of the individually-monitored timing.

Accordingly, even when one of the operation processors malfunctions, the independent and interlocking redundancy system 1 according to an example embodiment does not cause another operation processor out of the operation processors to take over a process that has been performed by the malfunctioned operation processor. In this case, the operation processors may monotonously continue their respective processes that have been performed so far.

A description is given next of the standby processor 3γ.

In a case where one of the operation processors malfunctions, the independent and interlocking redundancy system 1 according to an example embodiment may cause the standby processor 3γ to take over the process that has been performed by the malfunctioned operation processor.

It is to be noted that whether the taking over of the process of the malfunctioning operation processor by the standby processor 3γ is temporal or permanent may be determined as necessary on the basis of a status of use or any other factor of the independent and interlocking redundancy system 1. For example, in a case where the taking over of the process of the malfunctioning operation processor by the standby processor 3γ is determined as temporal, the malfunctioning operation processor may be repaired or replaced by a different operation processor, following which the process may be returned and processed by the repaired or the replaced operation processor. In a case where the taking over of the process of the malfunctioning operation processor by the standby processor 3γ is determined as permanent, the standby processor 3γ that has taken over the process may be used continuously thereafter as the operation processor.

The standby processor 3γ makes a transition from a standby state to a warming-up state when one of the operation processors 3α and 3β malfunctions (e.g., when the operation processor 3α malfunctions).

In the warming-up state, the non-malfunctioning one of the operation processors 3α and 3β (e.g., the operation processor 3β) transmits, to the control target 2, the control command that is the same as the control command transmitted to the control target 2 by the non-malfunctioning operation processor 3β, at a timing at which the malfunctioning operation processor 3α is supposed to transmit the control command to the control target 2.

After the warming-up state and the warm-up of the standby processor 3γ is completed, the standby processor 3γ may serve equally as the operation processor, and transmits the control command to the control target 2 independently from the non-malfunctioning operation processor 3β and by taking turns with respect to the non-malfunctioning operation processor 3β.

In the following, a description is given in detail of an operation, etc., of the standby processor 3γ.

Figure 2:
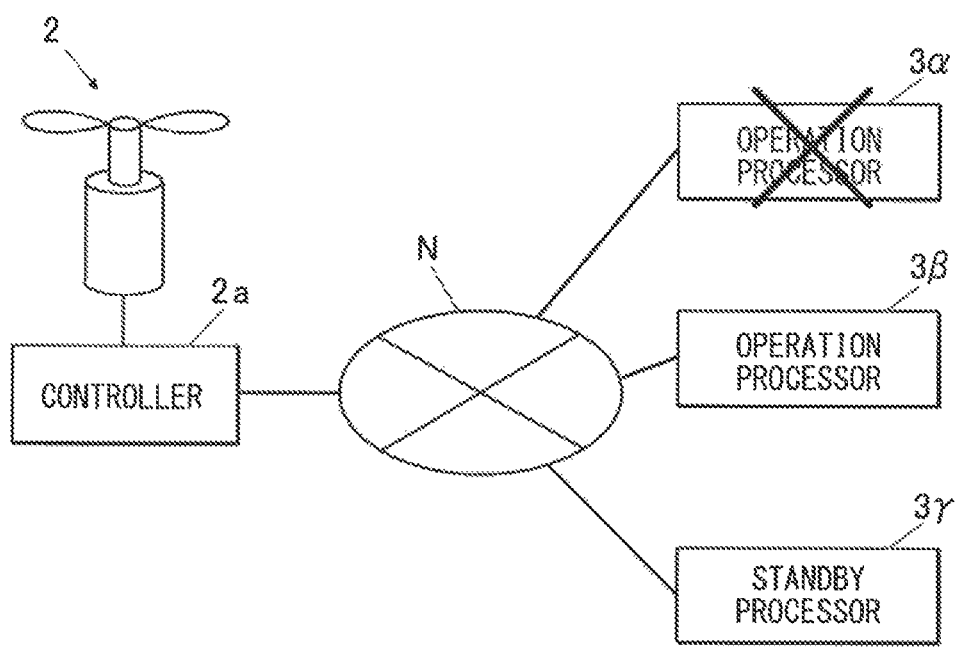
FIG. 2 is a diagram illustrating that an operation processor 3α is malfunctioning in the independent and interlocking redundancy system illustrated in FIG. 1.

With reference to FIG. 2, the description is given in the following by referring to an example embodiment where the operation processor 3α malfunctions in the independent and interlocking redundancy system 1, as indicated by a cross sign "x" in the drawing.

The standby processor 3γ may be completely equal in configuration to each of the operation processors 3α and 3β. Hence, optionally, the standby processor 3γ may not have a configuration special to the standby processor 3γ.

Further, placing the standby processor 3γ in the standby state or in the warming-up state means that the standby processor 3γ is in the standby state or in the warming-up state with regard to the controlling of the control target 2. Hence, the standby processor 3γ may perform any other process other than the controlling of the control target 2 or may stand by without performing any other process, during a period in which the standby processor 3γ is placed in the standby state or in the warming-up state.

In an example embodiment, the standby processor 3γ may have, in advance, data on the number "n" of the operation processors provided in the independent and interlocking redundancy system 1 (n=2 in an example embodiment).

The standby processor 3γ may monitor the above-described timing as with the operation processors 3α and 3β. Further, the standby processor 3γ may monitor whether the end signal is transmitted from the communication network N for each timing. In this case, optionally, it is not necessary for the standby processor 3γ to recognize which of the operation processors 3α and 3β has transmitted the end signal.

Further, in an example embodiment, the standby processor 3γ may determine that any of the operation processors malfunctions, in a case where, despite the arrival of timing, the corresponding end signal is not transmitted from the communication network N. When determining that any of the operation processors malfunctions, the standby processor 3γ makes the transition from the standby state to the warming-up state.

Note that, in a case where the standby processor 3γ determines that one of the operation processors malfunctions, optionally, it is not necessary for the standby processor 3γ to recognize which of the operation processors 3α and 3β malfunctions.

Thereafter, the standby processor 3γ may take over the malfunctioning operation processor (e.g., the operation processors 3α), and transmits the control command to the communication network N, i.e., to the control target 2, at the timing at which the malfunctioning operation processor 3α is supposed to transmit the control command.

In other words, the standby processor 3γ may refrain from determining the control command at a timing (at which timing the operation processor 3β transmits the control command) that is subsequent to the timing at which no end signal is transmitted from the communication network N, and may determine and transmit the control command at a timing that is subsequent to the timing at which the operation processor 3β transmits the control command.

That is, in an example embodiment, the operation processor 3β and the standby processor 3γ may transmit the control command to the control target 2 at the respective alternate timings.

It is to be noted that, in some embodiments where the independent and interlocking redundancy system 1 includes the n-number of operation processors, the standby processor 3γ may generally refrain from determining the control command at each of timings from a first timing to an "n−1 th" timing (the operation processors may transmit the control command at each of those timings), and determine the control command and transmit the determined control command at an "n th" timing. The first timing is a timing that is subsequent to the timing at which no end signal is transmitted, i.e., the timing at which any of the operation processors is malfunctioned.

Specifically, during the warming-up state, it is necessary for the standby processor 3γ to perform any necessary calculation process, such as launching a program, changing modes, or performing integration of internal parameters. Accordingly, during such a period in which the standby processor 3γ performs any necessary calculation process, the standby processor 3γ can fail to determine the control command or a parameter in this case, or can fail to determine an appropriate control command.

Accordingly, in the warming-up state, the standby processor 3γ transmits, to the control target 2, the control command that is the same as the control command transmitted to the control target 2 by the non-malfunctioning operation processor 3β, at the timing at which the malfunctioning operation processor 3α is supposed to transmit the control command, i.e., at the "n th" timing described above.

For example, in the warming-up state, when the control command transmitted by the operation processor 3β at a certain timing is sent from the communication network N, the standby processor 3γ may temporarily cause a memory to store that control command. Further, at a subsequent timing, the standby processor 3γ may read out the control command from the memory (i.e., the control command that is the same as the control command transmitted by the operation processor 3β), and may transmit the read-out control command to the control target 2 through the communication network N.

Accordingly, in an example case where the operation processor 3α is not malfunctioning and where the operation processor 3β and the operation processor 3α transmit the control commands (e.g., parameters) of 1, 2, 3, 4, 5, and so forth alternately at their respective timings, the operation processor 3β and the standby processor 3γ may transmit the control commands (e.g., parameters) of 1, 1, 3, 3, 5, and so forth alternately at their respective timings, when, in the same situation, the operation processor 3α malfunctions thereafter and the standby processor 3γ is still in the warming-up state.

The independent and interlocking redundancy system 1 according to an example embodiment thus can involve repeated transmission of the same control command (e.g., the same parameter) to the control target 2 or can involve an increase of the control command (e.g., parameter) by 2, even in a case where the control command (e.g., the parameter) is supposed to increase by 1 (one) for each timing. In this case, the independent and interlocking redundancy system 1 according to an example embodiment leaves rooms for improvement in terms of making the control to be performed on the control target 2 smooth.

On the other hand, the independent and interlocking redundancy system 1 according to an example embodiment at least helps to prevents an occurrence of a situation where the control command is not transmitted at a timing at which the control command is supposed to be transmitted to the control target 2 or an occurrence of a delay in transmitting the control command, making it possible to ensure that the control command is transmitted to the control target 2 at each timing.

Hence, unlike an existing system, the independent and interlocking redundancy system 1 according to an example embodiment is able to continue performing the control to be performed on the control target 2 at an appropriate timing, without causing a situation where the control target 2 is uncontrolled by the operation processors or where the control timing is delayed even when any of the operation processors malfunctions.

Note that, in an example embodiment where the independent and interlocking redundancy system 1 includes three or more operation processors (n≥3), the standby processor 3γ may refrain from determining the control command at each of timings from the first timing to the "n−1 th" timing, and may temporarily cause the memory to store the control command transmitted from the communication network N at the "n−1 th" timing. The first timing is a timing that is subsequent to the timing at which no end signal is transmitted from the communication network N.

Further, the standby processor 3γ may read out the control command from the memory (i.e., the control command that is the same as the control command transmitted at the "n−1 th" timing by the non-malfunctioning operation processor) and transmit the read-out control command to the control target 2 through the communication network N at the "n th" timing, i.e., at the timing at which the standby processor 3γ transmits the control command.

After the standby processor 3γ in the warming-up state progresses any necessary calculation process such as performing the integration of internal parameters and completes its warm-up, the standby processor 3γ may be able to determine the control command, or a parameter in this case, appropriately.

Thus, after the completion of the warm-up, the standby processor 3γ is able to determine the control command by itself, and transmit the control command independently from the non-malfunctioning operation processor 3β and by taking turns with respect to the non-malfunctioning operation processor 3β in an example embodiment.

In some embodiments, the standby processor 3γ may determine that the warm-up of the standby processor 3γ is completed, when a difference between the control command transmitted by any other operation processor 3β (e.g., the control command stored in the memory of the standby processor 3γ) and the control command uniquely determined by the standby processor 3γ in the warming-up state falls within a predetermined error range. In this case, the standby processor 3γ may determine that the standby processor 3γ is now able to appropriately determine the control command as with any other operation processor 3β.

The independent and interlocking redundancy system 1 according to an example embodiment is thus able to restore a state in which, even when one of the operation processors malfunctions, any other operation processor and the standby processor transmit, independently from each other and by taking turns, the control command to the control target 2 at the respective appropriate timings.

According to the independent and interlocking redundancy system 1 in an example embodiment, the standby processor makes the transition from the standby state to the warming-up state when one of the operation processors malfunctions. In the warming-up state, the standby processor transmits, to the control target, the control command that is the same as the control command transmitted to the control target by the non-malfunctioning operation processor, at the timing at which the malfunctioning operation processor is supposed to transmit the control command to the control target.

After the warming-up state and the warm-up of the standby processor is completed, the standby processor may serve as the operation processor, and transmits the control command independently from the non-malfunctioning operation processor and by taking turns with respect to the non-malfunctioning operation processor.

Thus, the independent and interlocking redundancy system 1 according to an example embodiment makes it possible to continue performing the control at an appropriate timing, without causing a situation where the control target is uncontrolled by the operation processors or where the control timing is delayed even when any of the operation processors malfunctions.

Accordingly, even when any of the operation processors malfunctions, it is possible to prevent an occurrence of a situation where the control target is uncontrolled by any of the processors (i.e., where an interruption occurs in the control to be performed by the processors) or where the control timing is delayed. For example, in a case where a mobile body is an aircraft, it is possible to prevent an occurrence of a situation where a flight of the aircraft may possibly become difficult. Accordingly, it is possible to improve safety, etc., of the mobile body such as the aircraft.

Although some example embodiments of the technology have been described in the foregoing, the technology is by no means limited to the example embodiments described above. Various changes and modifications may be made to any embodiment without departing from the scope of the technology.

For example, in an example embodiment described above, the standby processor 3γ may perform the process without identifying which of the operation processors malfunctions. In an alternative example embodiment, the standby processor 3γ may identify which of the operation processors malfunctions.

Figure 3:
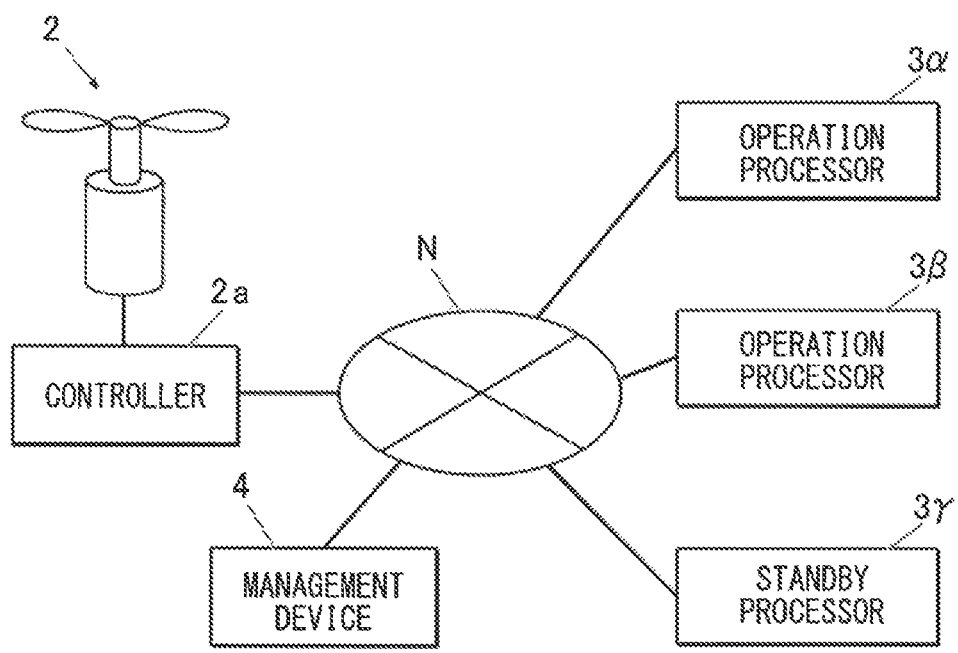
FIG. 3 is a diagram illustrating an example of a configuration of the independent and interlocking redundancy system that includes a management device, according to one example embodiment of the technology.

In some embodiments, the independent and interlocking redundancy system 1 may include a management device 4 as illustrated in FIG. 3. The management device 4 may perform, for example, a process of causing the standby processor 3γ to make the transition from the standby state to the warming-up state when one of the operation processors malfunctions.

In other words, in such embodiments, the standby processor 3γ may perform one or more of the processes described above in accordance with the instructions given from the management device 4.

The management device 4 may also configured to stop managing the standby processor 3γ once the warm-up of the standby processor 3γ is completed, in a case where the standby processor 3γ, having taken over the process of the malfunctioning operation processor, is to be used continuously thereafter.

In such an example embodiment, the standby processor 3γ is no longer under the management of the management device 4 after the warm-up, and may continuously perform the controlling of the control target 2 as the single independent operation processor.

Further, although reference is made to the aircraft in an example embodiment described above, the independent and interlocking redundancy system 1 according to any embodiment of the technology is applicable to a mobile body other than the aircraft, such as a vehicle or a vessel. An application of the independent and interlocking redundancy system 1 according to any embodiment of the technology is not limited to the mobile body such as the aircraft as well. Any embodiment of the technology is applicable to any system, as long as the system controls one or more control targets by the multiple processors.

According to any embodiment of the technology, it is possible to continue performing a control without causing a situation where the control target is uncontrolled by the processors or where a control timing is delayed even when any of the processors malfunctions in a system that includes the multiple processors.

One or more of the operation processors 3α and 3β, the standby processor 3γ, and the management device 4 illustrated in FIGS. 1 to 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of any of the operation processors 3α and 3β, the standby processor 3γ, and the management device 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of any of the operation processors 3α and 3β, the standby processor 3γ, and the management device 4 illustrated in FIGS. 1 to 3.

The invention claimed is:

1. An independent and interlocking redundancy system comprising:
    one or more control targets;
    operation processors including a first operation processor and a second operation processor; and
    one or more standby processors,
    wherein, at a first timing, the first operation processor i) derives a first control command and ii) transmits the derived first control command to the one or more control targets and the one or more standby processors,
    wherein, at a second timing, the second operation processor i) derives a second control command and ii) transmits the derived second control command to the one or more control targets and the one or more standby processors,
    wherein the first timing arrives when 1) a first transmission request is transmitted from the one or more control targets or 2) a first clock signal is issued from a clock,
    wherein the second timing arrives when 1) a second transmission request is transmitted from the one or more control targets or 2) a second clock single is issued from the clock,
    wherein the first timing and the second timing arrive alternately,
    wherein the one or more standby processors receive 1) a first end signal from the first operation processor when the first operation processor completes the transmission of the derived first control command at the first timing and 2) a second end signal from the second operation processor when the second operation processor completes the transmission of the derived second control command at the second timing,
    wherein when the second timing arrives while the one or more standby processors await to receive the first end signal from first operation processor and when the second operation processor transmits the second control command to the one or more control targets and the one or more standby processors in response to the arrival of the second timing, the one or more standby processors i) determine that the first operation processor is malfunctioning and ii) transition from a standby state to a warming-up state,
    wherein when the first timing arrives after the second operation processor completes the transmission of the derived second control command while the one or more standby processors are in the warm-up state, the one or more standby processors transmit, in response to the arrival of the first timing, a most recently received control command, which is the second control command, to the one or more control targets at the first timing at which the first operation processor is supposed to transmit the first control command, and
    wherein, when the one or more standby processors exit the warm-up state, the one or more standby processors i) derive a third control command and ii) transmit, to the one or more control targets, the derived third control command at the first timing.

2. The independent and interlocking redundancy system according to claim 1, further comprising a management device configured to:
    control the one or more standby processors to make the transition from the standby state to the warming-up state when the first operation processor of the operation processors malfunctions; and
    control the one or more standby processors to transmit the second control command that is the most recently received control command, at the first timing at which the first operation processor that is a malfunctioning one of the operation processors is supposed to transmit the first control command to the one or more control targets.

* * * * *